United States Patent
Cross et al.

(10) Patent No.: US 6,848,672 B2
(45) Date of Patent: Feb. 1, 2005

(54) MOUNTING BRACKET FOR VALVE ACTUATOR

(75) Inventors: Charles W. Cross, Willoughby, OH (US); Robert W. Jacobs, Mayfield Heights, OH (US); Gary W. Scheffel, Streetsboro, OH (US); Michael M. Stankovich, Lakewood, OH (US)

(73) Assignee: Swagelok Company, Solon, OH (US)

( * ) Notice: Subject to any disclaimer, the term of this patent is extended or adjusted under 35 U.S.C. 154(b) by 135 days.

(21) Appl. No.: 10/260,849

(22) Filed: Sep. 30, 2002

(65) Prior Publication Data

US 2003/0066981 A1 Apr. 10, 2003

Related U.S. Application Data

(60) Provisional application No. 60/326,980, filed on Oct. 4, 2001.

(51) Int. Cl.[7] .............................................. F16K 31/00
(52) U.S. Cl. ........................................ 251/292; 285/921
(58) Field of Search ................................ 251/292, 291; 285/921, 319; 137/269, 271, 884

(56) References Cited

U.S. PATENT DOCUMENTS

| | | | |
|---|---|---|---|
| 2,691,384 A | 10/1954 | Mueller et al. | |
| 3,107,080 A | 10/1963 | Priese | |
| 3,261,266 A | 7/1966 | Ledeen et al. | |
| 3,409,859 A | * 11/1968 | Krehbiel | 403/326 |
| 3,460,799 A | 8/1969 | Sanctuary | |
| 3,650,506 A | 3/1972 | Bruton | |
| 3,879,068 A | * 4/1975 | Stampfli | 137/271 |
| 3,901,271 A | 8/1975 | Stewart | |
| 3,993,284 A | 11/1976 | Lukens, Jr. | |
| 4,087,074 A | 5/1978 | Massey et al. | |
| 4,135,546 A | 1/1979 | Morrison | |
| 4,135,838 A | 1/1979 | Vandenberg | |
| 4,231,389 A | 11/1980 | Still et al. | |
| 4,270,849 A | 6/1981 | Kalbfleisch | |
| 4,310,015 A | 1/1982 | Stewart et al. | |
| 4,313,595 A | 2/1982 | Markley et al. | |
| 4,630,636 A | 12/1986 | Cutcher | |
| 4,633,897 A | 1/1987 | Effenberger | |
| 4,691,733 A | 9/1987 | Zinn | |
| 4,719,939 A | 1/1988 | Killian | |
| 4,727,899 A | 3/1988 | Massey et al. | |
| 4,769,963 A | 9/1988 | Meyerson | |
| 4,836,497 A | 6/1989 | Beeson | |
| 4,887,634 A | 12/1989 | Killian | |
| 4,961,444 A | 10/1990 | Morgan et al. | |
| 4,998,396 A | 3/1991 | Palmersten | |
| 5,109,883 A | 5/1992 | Squirrell | |
| 5,131,625 A | 7/1992 | Hacker et al. | |
| 5,236,172 A | 8/1993 | Friemoth et al. | |
| 5,240,030 A | 8/1993 | Wang | |
| 5,244,183 A | 9/1993 | Calvin et al. | |
| 5,257,771 A | 11/1993 | Portis et al. | |
| 5,271,425 A | 12/1993 | Swartzlander | |
| 5,327,925 A | 7/1994 | Ortel | |
| 5,340,078 A | 8/1994 | Dean | |
| 5,469,606 A | 11/1995 | Hansen | |
| 5,564,461 A | 10/1996 | Raymond, Jr. et al. | |
| 5,634,486 A | 6/1997 | Hatting et al. | |
| 5,853,022 A | 12/1998 | Eggleston et al. | |
| 5,887,608 A | 3/1999 | Bordelon et al. | |
| 5,910,244 A | 6/1999 | Stamos et al. | |
| 5,954,088 A | 9/1999 | Huang | |
| 6,050,662 A | * 4/2000 | Filipek et al. | 312/352 |
| 6,135,417 A | 10/2000 | Wadsworth et al. | |
| 6,269,834 B1 | * 8/2001 | Huhnen | 137/269 |

FOREIGN PATENT DOCUMENTS

| | | |
|---|---|---|
| EP | 0428277 A2 | 5/1991 |
| EP | 0795730 A1 | 9/1997 |

* cited by examiner

*Primary Examiner*—John Bastianelli
(74) *Attorney, Agent, or Firm*—Calfee, Halter & Griswold LLP

(57) ABSTRACT

A valve and actuator assembly includes a valve body, an actuator and a bracket that snap fits onto the valve body. The bracket includes a plate on which an actuator can be installed. In one form, the bracket is saddle shaped with depending legs that snap over a part of the valve body. Means such as bolts are provided to apply a gripping force to the legs so that the bracket is clamped onto the valve.

20 Claims, 2 Drawing Sheets

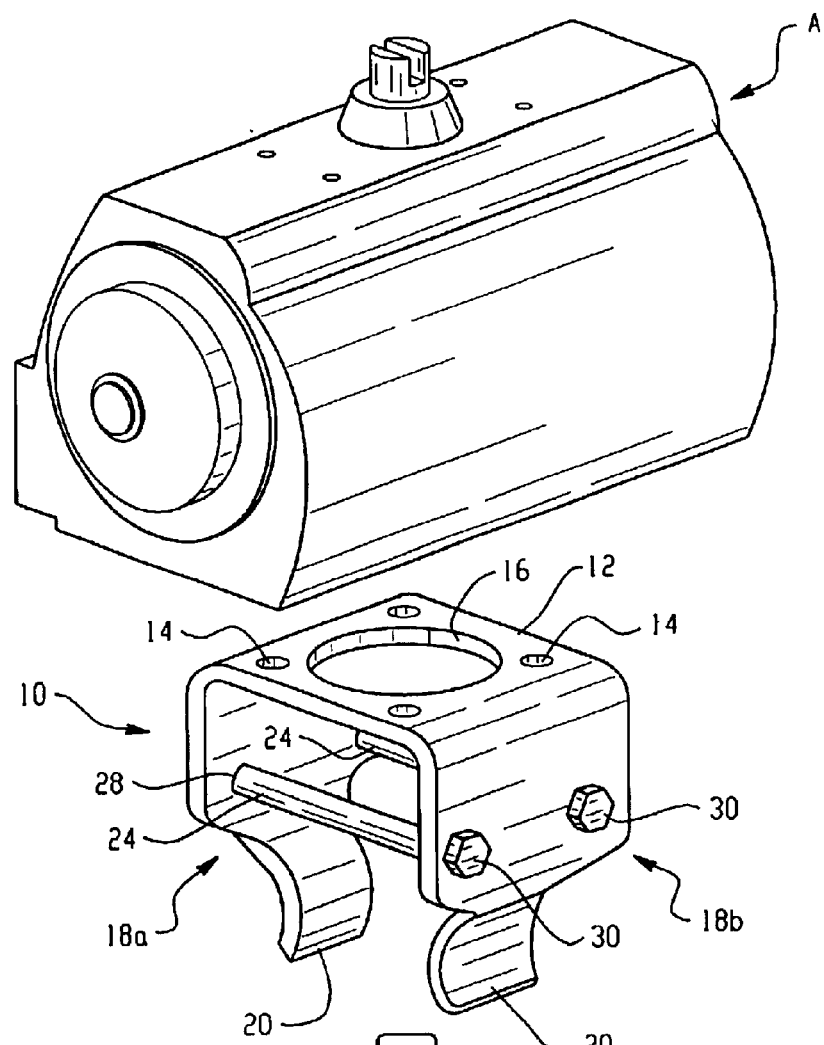
Fig. 1
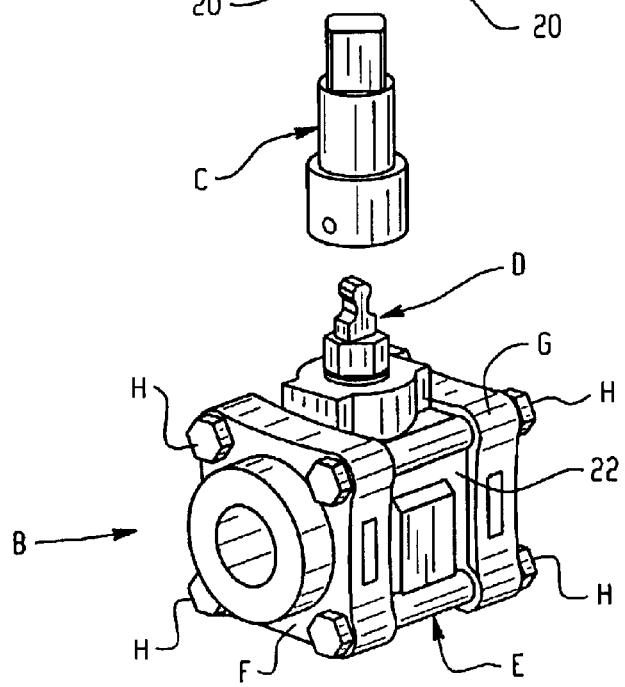

MOUNTING BRACKET FOR VALVE ACTUATOR

This appln claims benefit of 60/326,980 Oct. 4, 2001.

TECHNICAL FIELD OF THE INVENTION

The invention relates generally to valve and valve actuator assemblies. More particularly, the invention relates to a method and structure by which a valve actuator is snap fit installed on a valve body without any disassembly of the valve.

BACKGROUND OF THE INVENTION

Valves can be broadly classified as being actuated either manually, such as with a handle, or with a valve actuator. Valve actuators can take many forms including but not limited to pneumatic and electric actuators. Depending on the size and type, valve actuators can be quite heavy, weighing about ten to fifteen pounds or more. Therefore, a valve actuator is typically mounted on a valve body using a mounting bracket.

Valves are designed with one or more valve body seals to ensure that the valve operates in a leak proof manner. In a valve body, the body seals are optimally compressed and form strong seals against pressure upon initial assembly of the valve. However, some actuator installations, and specifically the mounting bracket, require at least a partial disassembly of the valve in order to attach the mounting bracket to the valve body. Even a partial disassembly must be performed carefully so as not to compromise the valve seals.

The need exists, therefore, in some valve designs for a mounting bracket that can be used to support a valve actuator on a valve body and that can be installed on the valve body without disassembling any part of the valve that could compromise valve body seal integrity.

SUMMARY OF THE INVENTION

The present invention contemplates in one embodiment an apparatus for mounting a valve actuator to a valve body. In this embodiment, a valve and actuator assembly includes a valve body, an actuator and a bracket that snap fits onto the valve body. The bracket includes a plate on which an actuator can be installed. In one form, the bracket is saddle shaped with depending legs that snap over a part of the valve body. Means such as bolts are provided to apply a gripping force to the legs so that the bracket is clamped or otherwise installed onto the valve. A method of installation is also contemplated for a snap on type actuator support bracket.

These and other aspects and advantages of the present invention will be readily appreciated and understood from the following detailed description of the invention in view of the accompanying drawings.

BRIEF DESCRIPTION OF THE DRAWINGS

FIG. 1 is an exploded perspective of one embodiment of the invention; and

DETAILED DESCRIPTION OF THE INVENTION

Figure 2:
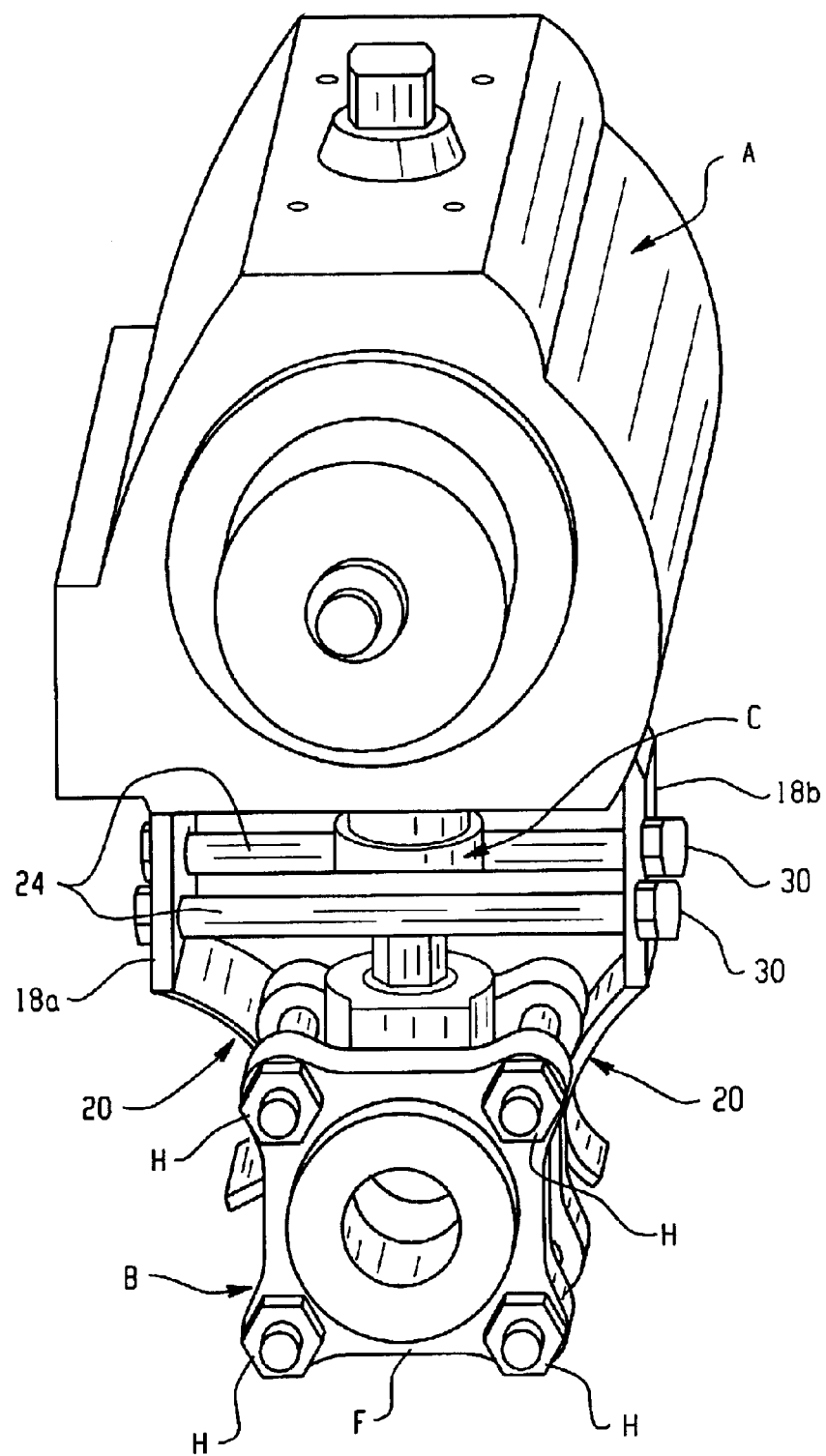
FIG. 2 is another perspective of the assembly of FIG. 1 in an assembled condition.

With reference to FIGS. 1 and 2, the present invention is directed to providing a mounting arrangement for a valve actuator A onto a valve B. In accordance with one aspect of the invention, the mounting arrangement provides a way to install the actuator A on the valve B without having to partially or otherwise disassemble the valve B, thereby preventing possible compromise of any seals in the valve B assembly. Although the invention is described herein with particular reference to a ball valve and a pneumatic actuator, such description is intended to be exemplary in nature and should not be construed in a limiting sense. The present invention may be realized with many different valve and actuator designs with modifications only needed for specific valve body/actuator configurations.

In accordance with one embodiment of the invention, a mounting bracket or frame 10 is provided that serves as a platform to support an actuator A on the valve B. By way of example, the actuator A may be a pneumatic or electric valve actuator as is well known in the art. The valve B may be a ball valve for example, such as a 60 series valve available from SWAGELOK® COMPANY. The invention may be used with any suitable valve and actuator combination however.

The bracket 10 may be made of any suitably strong material such as aluminum or steel, and in one embodiment is in the form of a saddle. The bracket 10 includes an upper base or plate 12 that is provided with a plurality of bolt holes 14. A series of corresponding bolts or screws (not shown) are used to mount the actuator A to the bracket 10 via the bolt holes 14 and aligning holes (not shown) in the bottom of the actuator A. The actuator A and the valve B in this example are operationally coupled via a drive coupling C. The coupling C interconnects an output drive of the actuator A (not shown) to the valve stem D of the valve B. In this manner the actuator A can operate the valve B.

The bracket 10 includes a central hole 16 in the upper plate 12 which accommodates the stem D. The saddle-like bracket 10 further includes a pair of support legs 18a, 18b that extend from the upper plate 12. Preferably although not necessarily the bracket 10 is made as an integral single piece such as from formed sheet metal or other suitable process. As best illustrated in FIG. 2, the legs 18a,b are rigid enough to fully support the weight of the actuator A. Each bracket leg 18a and 18b includes an end portion, tab or stirrup 20. These stirrups 20 are formed with a radially inward curve so as to engage the valve B as will be described herein.

In this example, the valve B includes a valve body E and two opposed end flanges F and G. These flanges are held on the valve body E by a series of bolts H. As is known in the art, when the valve B is assembled, the end flanges are sealed by a number of body seals within the valve B (not shown). It is desired to mount the actuator A on the valve B without having to loosen or disassemble the valve B thereby avoiding any possibility of compromising the body seals.

The curved stirrups 20 of the bracket 10 are thus spaced apart by a selected distance so as to have a "snap on" mounting arrangement with the valve body B. In this example, the stirrups 20 spread apart slightly as they are snapped over the bolts H on the valve B. The stirrups 20 then are received in corresponding recesses 22 below the bolts H. Thus the stirrups 20 are rigid enough to support the actuator A on the valve B, yet slightly flexible enough to permit them to snap over the valve body E.

After the bracket 10 is installed on the valve B, a pair of bracket clamp bolts 24 are used as a means to securely mount the bracket 10 onto the valve body E by applying a clamping force to the legs 18a, 18b. The clamp bolts 24 extend through respective holes 28 in the bracket legs 18a, 18b and when the bolts 24 are tightened with respective nuts 30, a clamping force is applied to the legs 18a and 18b as well as the stirrups 20, drawing the stirrups 20, which are in tension towards one another to clamp them against the valve body E (see FIG. 2). This completes the assembly of the bracket 10 to the valve B. The actuator A may be installed on the bracket 10 first, and then the bracket 10 installed on the valve, or the bracket 10 may be installed on the valve B first, with the actuator A installed thereafter. Other techniques may be used to securely clamp or install the bracket on the valve B if so required for a particular application.

The invention has been described with reference to the preferred embodiment. Modifications and alterations will occur to others upon a reading and understanding of this specification. It is intended to include all such modifications and alterations insofar as they come within the scope of the appended claims or the equivalents thereof.

We claim:

1. A valve and actuator assembly comprising:
    a valve body;
    an actuator; and
    a weight bearing bracket that snap fits onto said valve body, said bracket having a mounting plate which supports said actuator when installed thereon,
    wherein said bracket has said mounting plate and a pair of tabs coextending from said mounting plate, said tabs gripping opposed sides of said valve body,
    having at least one bolt that extends between said tabs to clamp said bracket onto said valve body.

2. The assembly of claim 1 wherein each said tabs are received in a respective recess associated with each one of said opposed sides.

3. The assembly of claim 2 wherein said tabs are separated by a first distance before said bracket is installed on said valve body, and arc flexible enough to separate wider to a second distance sons to snap fit over a portion of said valve body yet are rigid enough to support said actuator when said actuator is installed on said bracket.

4. The assembly of claim 3 wherein said second distance is greater than said first distance.

5. The assembly of claim 2 wherein said tabs snap fit over two generally parallel bolts associated with said valve body.

6. The assembly of claim 5 wherein said bolts secure two end flanges to said valve body.

7. The assembly of claim 1 wherein said bracket snaps auto said valve body and is secured thereto without disassembly of any part of said valve.

8. The assembly of claim 1 wherein said bracket is clamped to said valve body after said actuator is installed thereon.

9. The assembly of claim 1 comprising means for applying a force to said tabs to clamp said bracket onto said valve body.

10. The assembly of claim 1 comprising a coupling that extends between said tabs and operatively couples said actuator to said valve.

11. In a valve and valve actuator assembly of the type having a valve body with at least two opposed sides, the improvement comprising:
    a bracket that supports the actuator on the valve body; said bracket being generally saddle shaped with two stirrups that snap fit over a portion of the valve body; said stirrups extending from a plate on which an actuator can be installed; and
    at least one member that interconnects said stirrups and applies a force to said stirrups to hold said bracket onto the valve body.

12. The assembly of claim 11 wherein the at least one member is a bolt.

13. The assembly of claim 11 wherein said stirrups snap fit over two flange bolts on the valve body.

14. The assembly of claim 11 wherein said stirrups are flexible enough to separate a small distance when snap fit installed on the valve body yet rigid enough to support the actuator.

15. The assembly of claim 11 wherein said bracket can support a weight of about at least ten pounds.

16. A method for mounting a valve actuator to a valve body comprising the stops of:
    a) installing the actuator on a weight bearing mounting bracket; the weight bearing mounting bracket having stirrups that snap fit over a portion of the valve body,
    b) aligning a coupling between the actuator and the valve, and
    c) snap fit mounting said bracket on the valve body, installing a member that interconnects said stirrups and applies a force to said stirrups to hold said bracket onto said valve body.

17. The method of claim 16 comprising the step of applying a force to said bracket to clamp said bracket to the valve body after said snap fit mounting step.

18. The method of claim 16 wherein said step of installing the actuator on said mounting bracket is performed alter said mounting bracket is snap fit mounted on the valve body.

19. The method of claim 16 wherein said bracket and the actuator are installed on the valve body without disassembly of any part of the valve.

20. The assembly of claim 1 wherein said bracket comprises an integral bracket frame.

* * * * *

UNITED STATES PATENT AND TRADEMARK OFFICE
CERTIFICATE OF CORRECTION

PATENT NO. : 6,848,672 B2
DATED : February 1, 2005
INVENTOR(S) : Charles W. Cross et al.

Page 1 of 1

It is certified that error appears in the above-identified patent and that said Letters Patent is hereby corrected as shown below:

Column 3,
Line 36, delete "arc" and insert -- are --.
Line 37, delete "sons" and insert -- so as --.

Signed and Sealed this

Third Day of May, 2005

JON W. DUDAS
*Director of the United States Patent and Trademark Office*

UNITED STATES PATENT AND TRADEMARK OFFICE
CERTIFICATE OF CORRECTION

PATENT NO. : 6,848,672 B2
DATED : February 1, 2005
INVENTOR(S) : Cross et al.

It is certified that error appears in the above-identified patent and that said Letters Patent is hereby corrected as shown below:

<u>Column 3,</u>
Line 47, delete "auto" and insert -- onto --.

<u>Column 4,</u>
Line 43, delete "alter" and insert -- after --.

Signed and Sealed this

Twenty-third Day of May, 2006

JON W. DUDAS
*Director of the United States Patent and Trademark Office*